Oct. 14, 1941. P. G. SCHLEMMER 2,259,427
SLICER FOR BREAD LOAVES
Filed June 25, 1937 3 Sheets-Sheet 2

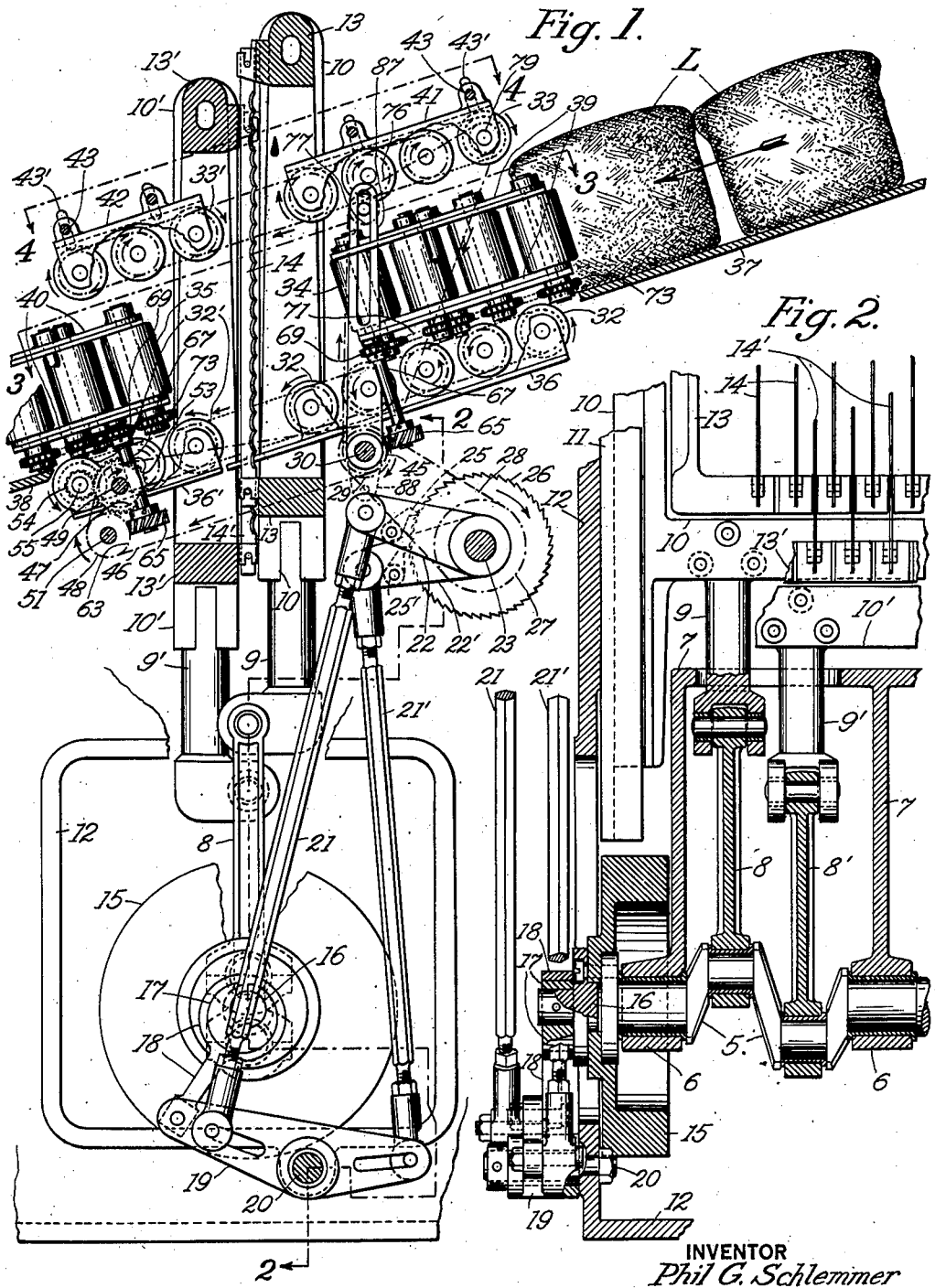

INVENTOR
Phil G. Schlemmer
BY
ATTORNEY

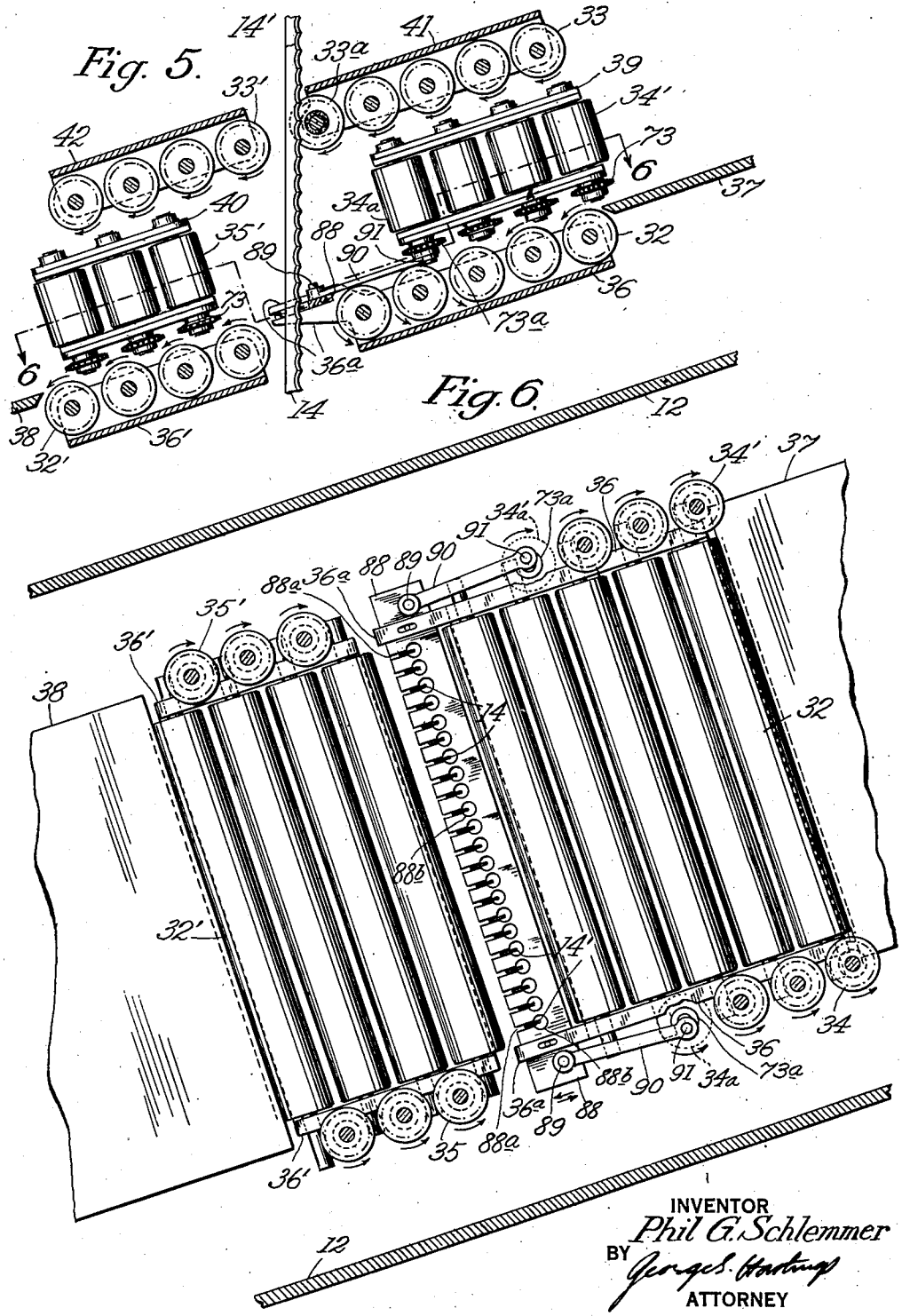

Patented Oct. 14, 1941

2,259,427

UNITED STATES PATENT OFFICE 2,259,427

SLICER FOR BREAD LOAVES

Phil G. Schlemmer, Nanuet, N. Y., assignor to American Machine & Foundry Company, a corporation of New Jersey Application June 25, 1937, Serial No. 150,217

6 Claims. (Cl. 146—153)

This invention relates to a method of slicing articles of a consistency similar to that of loaves of bread, cake and the like, and also relates to a machine for slicing bread and the like, and more particularly to such a machine of the known type having one or more sets of knives each of which frames is reciprocated in an upright path, the loaves of bread being advanced in a path which intersects the upright path of the knives at what may be designated briefly as the slicing station.

It is usual, in the operation of conventional bread slicers of the aforesaid known type, exemplified by that disclosed in the co-pending application of Robert J. Beutel, Serial No. 752,344, filed November 9, 1934, and which has matured as Letters Patent No. 2,141,947, issued December 27, 1938, to utilize a type of loaf feed such that the loaves travel through the slicer at a given rate of speed which is irrespective of the harmonic motion of the reciprocating knives. The loaves are thus fed past the knives even while the latter are standing still at their cyclical phases where slicing movement is arrested by the reversal of reciprocatory direction of movement of the knives.

Most, if not all, slicers of this general reciprocating type tend at times to produce slices characterized by more or less wavy and uneven slice faces due to the fact that the loaves are being fed through the knives more or less constantly, while the knives in the course of each complete reciprocation, pass from zero to maximum speed, owing to the changes in direction of movement of the knives as they pass through each cycle of their harmonic movement.

Under such conditions, it is an outstanding object of the present invention to provide a loaf feed which will result in the production of loaves that are free from such wavy surfaces, by causing the loaves to advance only when the slicer device is moving; and according to which the loaf feed is incapacitated and the loaves stand still momentarily during each period of knife reversal.

An object of ancillary importance is to provide a method of slicing such loaves which will assure harmonic conformity between the rate of reciprocatory slicer action and the rate of feed of the loaves to, and through, the slicing station.

Another object is to provide a slicer of improved structure, and in pursuance of this object provision is made of a set of endless feeding members, such as rolls, and preferably a series of supporting rolls is combined with a series of top rolls, and two series of side rolls may also be provided, to effect positively the feed of the loaves, so as to avoid the loaf-feeding at undesired times, and also to effect the accurate presentation of the loaves during the effective slicing phase of each recurrent operative cycle.

Still another object is to provide for coordinated adjustment of the several feed-roll sets included in a machine constructed in accordance with the present invention; also to provide for the proper slicing of different standard sizes of loaves, and to compensate for minor disconformities from the standard dimensions of a given loaf size which may be encountered from time to time in the slicing of individual loaves.

In pursuance of the invention, the last-named variations are preferably cared for by making the loaf-feeding rolls of resilient material, such as sponge rubber; and by setting the rolls for the minimum dimensions of each loaf size.

Other objects and features of the invention will be brought to light as the description of the particular physical embodiment selected to illustrate the invention progresses.

In the accompanying drawings, like characters have been applied to corresponding parts through the several views which make up the drawings, in which:

Fig. 1 is a view of a somewhat schematic character in sectional side elevation of a bread-slicing machine of the reciprocating type, in the construction of which the present invention has been embodied.

Fig. 2 is a fragmentary detail view in vertical section taken on the broken line 2—2 of Fig. 1;

Fig. 5 is a view similar to Fig. 2 of a modification; and

Fig. 6 is a view in horizontal section, taken on line 6—6 of Fig. 5.

Figure 3:
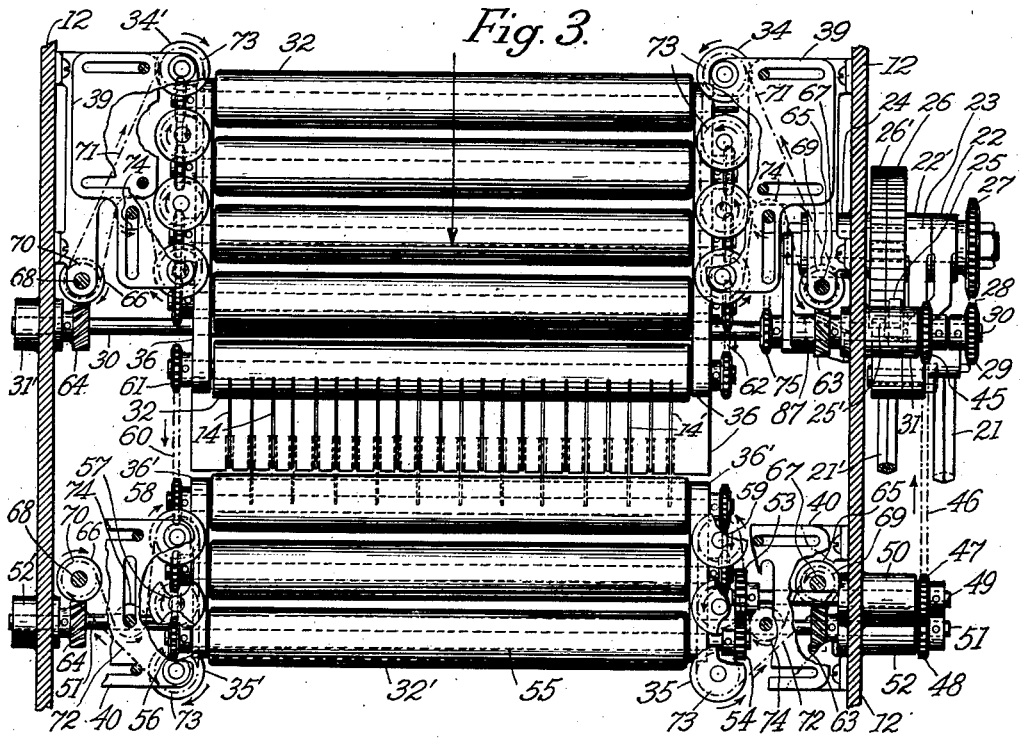
Fig. 3 is a fragmentary detail view, in plan, taken on the line 3—3 of Fig. 1.

In the now-preferred embodiment of the invention selected for illustration and description, the part designated generally by the reference character S is a slicing unit of the type disclosed in the aforesaid co-pending application for U. S. Letters Patent.

A slicing unit of the character illustrated in detail in the above mentioned application for Letters Patent is operated by a crank shaft 5 turning in bearings 6 of a crank case 7, and actuating through rods 8, 8', the vertical shafts 9, 9', to which are attached the frames 10, 10' sliding in guides 11 mounted on main frame 12.

In the slide frames 10, 10' are supported cradles 13, 13' carrying the slicer knives 14, 14'. To the flywheel 15 on crank shaft 5 is fastened a concentric stud 16 carrying an eccentric disc 17 which turns in the eccentric sleeve 18. The latter is pivoted to one end of a rocker arm 19 swinging on a stud 20 attached to frame 12. The rocker arm 19, by means of two rods 21, 21' adjustably attached to opposite sides of its fulcrum 20, is connected to two arms 22, 22' loosely mounted on a shaft 23 turnable in a bearing 24 of frame 12. The arm 22, 22' carry pawls 25, 25' engaging with ratches 26, 26' fast on shaft 23 to which is also affixed a sprocket 27. The latter, by means of a chain 28 and a sprocket 29 drives a through-shaft 30 supported in bearings 31, 31' of frame 12.

The shaft 30 actuates all the elements of the loaf feed, which may consist of numbers of individual rollers or of corresponding sets of end rollers connected by belts, as illustrated. In the drawings, two sets of bottom rollers, one set 32 in front of the knives, and a second set 32' in their rear, are shown, also two sets of top rollers 33 and 33', and four sets of side rollers 34, 34' and 35, 35' (see Fig. 3). The bottom rollers, 32, 32', which are supported in frames 36, 36' form a continuation between the inclined flights 37 and 38 of the loaf conveyor which bring the unsliced loaves L to the slicer and take the sliced loaves away from it. The side rollers are supported in horizontally adjustable frames 39, 40 attached to the side frames 12 (see Fig. 3), the slidable parts of the frames 39 and 40 permitting the side rollers to be adjusted for different loaf lengths. The top rollers 33, 33' are supported in frames 41, 42, suspended from rods 43 slidable in slots 43' of frame 12 (see Fig. 1), permitting vertical adjustment of the same, by wing nuts 44 (see Fig. 4), to accommodate various loaf heights.

A sprocket 45 on shaft 30, by a chain 46 and sprockets 47 and 48 drives a shaft 49 supported in a bearing 50 of frame 12, and a shaft 51 supported in bearings 52 and 52' of frame 12. The shaft 49 has a gear 53 meshing with a gear 54 on the front end of shaft 55 of bottom roller 32', the shaft 55 on its other end carrying a sprocket 56 connected by a chain 57 with a sprocket 58 on the shaft of the adjacent roller which in turn, by a chain 59 on the front end, drives the next roller, and so on, Fig. 3. The last roller of set 32' through a chain 60, drives the sprocket 61 of the first roller of set 32, and this, in turn, by a chain 62 drives the second roller, and so on to the last bottom roller 32 which receives the loaf L.

Each of the through-shafts 30 and 51 carries two spiral gears, 63 and 64, one right hand and one left hand, one at the inside of each of the bearings 31, 31' and 52, 52', these spiral gears meshing with spiral gears 65 and 66 on vertical shafts 67 and 68 supported in the stationary parts of the adjustable frames 39 and 40. Sprockets 69 and 70 on shafts 67 and 68 drive chains 71 and 72 passing over sprockets 73 on the shafts of all the side rollers in each set, thus driving the side rollers in synchronism with the bottom rollers. Each of the chains 71, 72 runs over an adjustable idler 74 (see Fig. 3), supported in a slot in the slidable part of frames 39 and 40, thereby permitting these chains to follow any adjustment of the side rollers.

Figure 4:
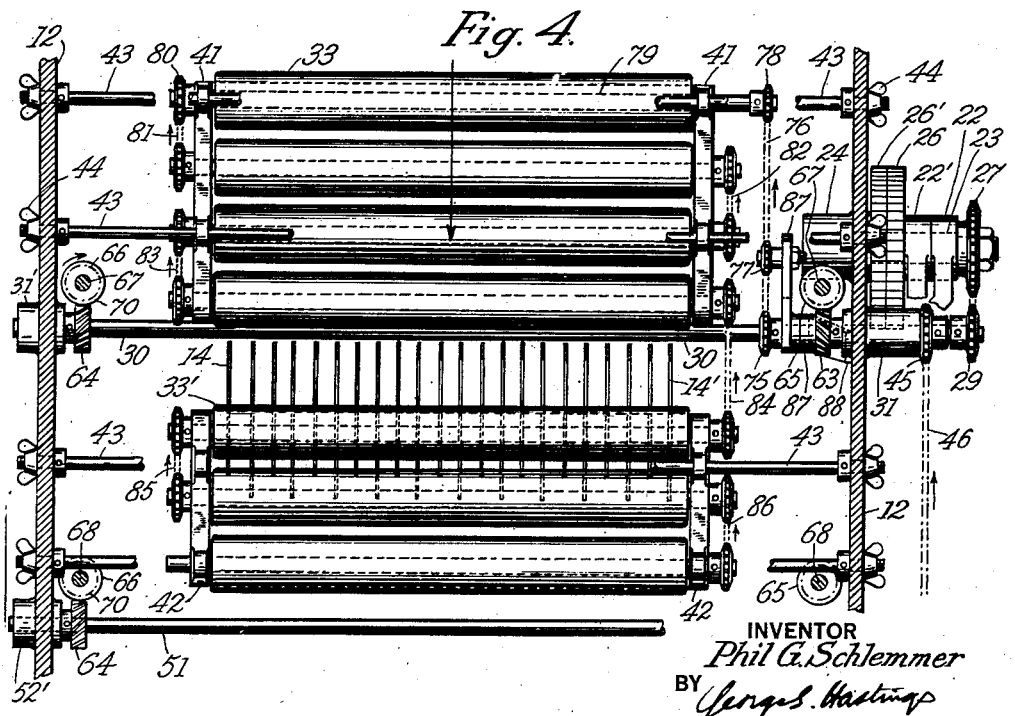
Fig. 4 is a view similar to Fig. 1 of a slicing machine in the construction of which the present invention has been embodied.

A sprocket 75 on shaft 30, Fig. 4, by a chain 76 running over an adjustable idler 77 drives a sprocket 78 on the front end of shaft 79 of top roller 33. The latter, by a sprocket 80 and a chain 81 at its rear end, drives the second roller which through a chain 82 at its front end drives the third roller, and so on through chains 83, 84, 85 and 86 at alternate ends to the last roller. The idler 77 is supported in a slot of an arm 87 loosely mounted on shaft 30 and held in position by an extension 88 fastened to the inside of frame 12. By properly adjusting the idler 77 in arm 87, the chain 76 can be made to follow any adjustment of the top rollers for different heights of loaves.

During each half-revolution of the crank shaft 5 one of the pawls 25 advances by one stroke of the respective rod 21, both pawls being at rest when the knives 14 are reversing. By adjusting the position of the rods 21 on rocker arm 19, the length of their stroke and thereby the forward speed of the loaves L while passing through the slicer can be varied to obtain best cutting results under different conditions.

From the foregoing disclosure it will be understood readily that provision is made for avoiding substantially the disadvantages of producing sliced loaves of bread with wavy slice faces, and for producing loaves of bread with evenly faced slices; also that this desirable result has been attained by the novel method of causing the slicing and loaf-feed to act in harmonic conformity with each other; and that improved apparatus of the reciprocatory slicing type has been provided to carry the aforesaid method into effect.

It is to be understood that while I have disclosed what I believe to be the best embodiment of the present invention now known to me, nevertheless the particular physical embodiment herein illustrated and described is not to be considered as exhausting the possible embodiments of the basic idea of means underlying the invention.

For example, in Figs. 5 and 6, are illustrated several modifications of the above structure which may be provided to add to the efficiency of slicing mechanism of the class described.

In the structure shown in both of the last-mentioned figures, provision is made of an auxiliary horizontal plate 88 of comb-like character, the leading edge of which is slotted, as at 88a, to fit the spaces between the upright knife blades 14 and 14'.

Each of the slots 88a terminates in an enlargement or orifice 88b which affords clearance for crumbs broken away from the slices by the attrition of the knife blades 14 and 14'. An extension 36a of the frame part 36 serves to support the auxiliary plate at each end thereof.

The auxiliary plate is provided, as at 88, with studs 89 from which extend eccentric rods 90 to crank pins 91 mounted on collars or hubs 73a, on, and rotatable with, the upright guide rolls 34a and 34'a, respectively. A sprocket wheel 73a is provided on the shafts of rolls 34a and 34'a to effect rotation by the chains 71, 72.

With each such rotation, the auxiliary plate is oscillated to and fro, and tends, as it is advanced, to aid in feeding the loaf to the knives. When retracted, it makes the full opening of each orifice 88b available to clear the crumbs; and the jogging action promotes an effective cooperation of the working parts, and also shakes the loaf forward, shakes the crumbs down, and avoids adhesions of any contiguous relatively moving parts.

In Fig. 5 is shown at 33a an end roll of the upper feeding set which is provided with a series of circumferential grooves, as 33a, each entered by one of the knife blades of the series 14 and of the series 14' respectively; this grooved roll constituting an endless moving feeding means projecting into the spaces between the knives to steady and advance the loaf, and to steady the knives 8 a certain extent.

What is claimed is:

1. A bread slicing machine of the class described: said machine comprising a reciprocating slicing device; and feeding mechanism including at least one set of rolls for supporting said loaves successively as they are advanced sidewise to the slicing device, and another set of top rolls; also a pair of sets of rolls engaged with the ends of said loaves, and means to drive all of said sets in unison to exert propulsive action upon all exposed faces of the loaves before and after slicing.

2. A bread slicing machine of the class described: said machine comprising a reciprocating slicing device; and feeding mechanism including at least one set of rolls for supporting said loaves successively as they are advanced sidewise to the slicing device, and another set of top rolls; also a pair of sets of rolls engaged with the ends of said loaves, and means for actuating said rolls and for co-ordinating the operations of the several sets; said actuating mechanism including a main driving member; a countershaft for each of said sets, all geared to said driving member; and a driving chain for each set of rolls, each chain being intergeared with the rolls of a set and with the corresponding countershaft for said set.

3. A bread slicing machine of the class described: said machine comprising a reciprocating slicing device; and feeding mechanism including at least one set of rolls for supporting said loaves successively as they are advanced sidewise to the slicing device, and another set of top rolls; also a pair of sets of rollers engaged with the ends of said loaves, and means for actuating said rolls and for co-ordinating the operations of the several sets; said actuating mechanism including a main driving member; a countershaft for each of said sets all geared to said driving member; and a driving chain for each set of rolls, each chain being intergeared with the rolls of a set and with the corresponding countershaft for said set, and means to support said countershafts in bodily adjustable disposition, and means to cause corresponding adjustments of said chains, to effect the slicing of loaves differing in dimensions.

4. A bread slicing machine of the class described: said machine comprising a reciprocating slicing device of the gang-knife type; and means to support each loaf as it passes through the slicing station, including an auxiliary plate of comb-like structure, having projections disposed in the spaces between the knives, and adapted to support the slices as they are formed; and means to oscillate said auxiliary plate to and fro relatively to the knives, in a plane contiguous to that of the loaf bottom, thereby aiding to advance the loaf.

5. A bread slicing machine of the class described: said machine comprising a reciprocating slicing device of the gang-knife type; and means to support each loaf as it passes through the slicing station, including an auxiliary plate of comb-like structure, having projections disposed in the spaces between the knives, and adapted to support the slices as they are formed; and means to oscillate said auxiliary plate to and fro relatively to the knives, in a plane contiguous to that of the loaf bottom, thereby aiding to advance the loaf, and a series of orifices in said plate, each in alignment with a knife and adapted to afford clearance through said plate for crumbs removed from the loaf by attrition of the slicing knives.

6. A bread slicing machine of the class described: said machine comprising a reciprocating slicing device of the gang-knife type; and means to support each loaf as it passes through the slicing station, including an auxiliary plate of comb-like structure, having projections disposed in the spaces between the knives, and adapted to support the slices as they are formed; and means to oscillate said auxiliary plate to and fro relatively to the knives, in a plane contiguous to that of the loaf bottom, thereby aiding to advance the loaf, and a series of orifices in said plate, each in alignment with a knife and adapted to afford clearance through said plate for crumbs removed from the loaf by attrition of the slicing knives, said orifices being in communication with the spaces between said projections of the comb-like structure, and so arranged as to permit entrance of the cutting edges of the knives into the orifices.

PHIL G. SCHLEMMER.